United States Patent
Tiberia et al.

[11] Patent Number: 6,149,224
[45] Date of Patent: Nov. 21, 2000

[54] BREAK AWAY TRIM PANEL ASSEMBLY

[75] Inventors: Joseph William Tiberia, Southgate; Alethea Keesia Morris, Royal Oak; Thomas Jay Corbett, Sterling Heights; George Jiri Strnad, Rochester; Peter J. Gareau, Warren, all of Mich.

[73] Assignee: Delphi Technologies, Inc., Troy, Mich.

[21] Appl. No.: 09/330,575

[22] Filed: Jun. 11, 1999

[51] Int. Cl.[7] ........................................ B60J 5/00
[52] U.S. Cl. ................... 296/146.7; 296/189; 296/39.1; 49/502; 280/751
[58] Field of Search .................. 296/146.7, 153, 296/189, 39.1; 49/502, 460; 280/751, 748

[56] References Cited

U.S. PATENT DOCUMENTS

| | | | |
|---|---|---|---|
| 4,785,585 | 11/1988 | Grier et al. | 49/502 |
| 4,800,638 | 1/1989 | Herringshaw et al. | 49/502 |
| 5,111,619 | 5/1992 | Billin et al. | 296/39.1 |
| 5,169,204 | 12/1992 | Kelman | 296/146.7 |
| 5,345,721 | 9/1994 | Stein et al. | 296/146.7 |
| 5,362,102 | 11/1994 | Hajek et al. | 296/146.7 |
| 5,433,498 | 7/1995 | Ishiwata | 296/39.1 |
| 5,482,344 | 1/1996 | Walker et al. | 296/146.7 |
| 5,529,370 | 6/1996 | Veit | 296/146.7 |
| 5,531,499 | 7/1996 | Vecchio et al. | 296/146.7 |
| 5,588,692 | 12/1996 | Gandhi et al. | 296/189 |
| 5,603,548 | 2/1997 | Gandhi et al. | 296/39.1 |
| 5,865,496 | 2/1999 | Odan et al. | 296/146.6 |
| 5,992,914 | 11/1999 | Gotoh et al. | 296/189 |

*Primary Examiner*—Joseph D. Pape
*Assistant Examiner*—Hilary Gutman
*Attorney, Agent, or Firm*—Kathryn A. Marra

[57] ABSTRACT

A break away trim panel assembly for a panel in an occupant compartment of a vehicle includes a trim panel having an inner side and an outer side and a reinforcement attached to the outer side of the trim panel. The reinforcement includes a channel. The break away trim panel assembly also includes a fastener disposed within the channel for attaching the trim panel to the panel, such that application of a force from a predetermined angle pushes the fastener through the channel to break away the trim panel from the panel in a predetermined direction.

11 Claims, 3 Drawing Sheets

BREAK AWAY TRIM PANEL ASSEMBLY

TECHNICAL FIELD

The present invention relates generally to trim panels and, more particularly, to a break away trim panel assembly for a vehicle.

BACKGROUND OF THE INVENTION

It is known to provide a trim panel assembly for a vehicle, to present an aesthetically pleasing appearance in an occupant compartment of the vehicle. For example, a trim panel assembly is mounted to an inner door panel of a door for the vehicle. The trim panel assembly includes a plurality of separate components, with each component having a specific function. Typical components include a door trim panel, door trim substrate, sound absorber, water barrier, armrest, and door handle.

Under certain circumstances a force may be applied to the door from a particular direction, such as the force resulting from an impact of an object. The applied force may induce movement of the trim panel assembly. If the trim panel assembly is rigidly retained on the door, the trim panel may bow inward and stiffen as a result of the application of a force. An object within the occupant compartment of the vehicle coming into contact with the rigidly retained trim panel assembly may experience an increased force.

Federal safety standards for vehicles set forth minimum requirements. For example, Federal Motor Vehicle Safety Standard (FMVSS) 214 promulgates side impact standards. During a side impact, a portion of the side structure of the vehicle, including the trim panel, may be pushed into the occupant compartment of the vehicle, and may in fact direct a contact force on a seated occupant. Thus, it is desirable to minimize the potential contact force on a seated occupant during a side impact.

In the past, various methods have been used to minimize the potential contact force on a seated occupant during a side impact. One method is to strengthen the side structure of the vehicle. While this method works well, the additional weight may have a detrimental effect on fuel economy. Another method is to fabricate the trim panel from a more flexible material. Still another method is to provide additional padding between the trim panel and the side structure. Yet still another method is for the trim panel to break away from a vehicle body panel upon the application of a force by securing a mounting mechanism for a trim panel into a slotted opening in the vehicle body panel. While this method works well for a stationary body panel, it does not function as well for a non-stationary body panel such as a door, because of the lateral forces on the door. Thus, there is a need in the art to provide a break away trim panel assembly that transfers the energy from an applied force back into the trim panel assembly, to reduce any potential contact force on the seated occupant from the applied force.

SUMMARY OF THE INVENTION

It is, therefore, one object of the present invention to provide a trim panel assembly that breaks away from a vehicle structure as a result of a force.

It is another object of the present invention to provide a trim panel assembly that breaks away to minimize a contact force directed towards a seated occupant.

To achieve the foregoing objects, the present invention is a break away trim panel assembly for a panel in an occupant compartment of a vehicle.

The break away trim panel assembly includes a trim panel having an inner side and an outer side and a reinforcement attached to the outer side of the trim panel. The reinforcement includes a channel. The break away trim panel assembly also includes a fastener disposed within the channel for attaching the trim panel to the panel, such that application of a force from a predetermined angle pushes the fastener through the channel to break away the trim panel from the panel in a predetermined direction.

One advantage of the present invention is that an improved break away trim panel assembly is provided f or a vehicle that breaks away from a side structure thereof as a result of an applied force. Another advantage of the present invention is that a break away trim panel assembly is provided that breaks away from a door, when a force is applied to the door from a predetermined angle, to allow the energy of the applied force to be transferred back into the trim panel assembly. Yet another advantage of the present invention is that an attachment bracket is provided that detaches from the door because of the applied force to the door from the predetermined angle. Still another advantage of the present invention is that as the trim panel detaches from the inner door panel, it moves forward and flexes so that the opportunity for a contact force directed towards a seated occupant is minimized.

Other objects, features an d advantages of the present invention will be readily appreciated as the same becomes better understood after reading the subsequent description when considered in connection with the accompanying drawings.

DESCRIPTION OF THE PREFERRED EMBODIMENT

Figure 1:
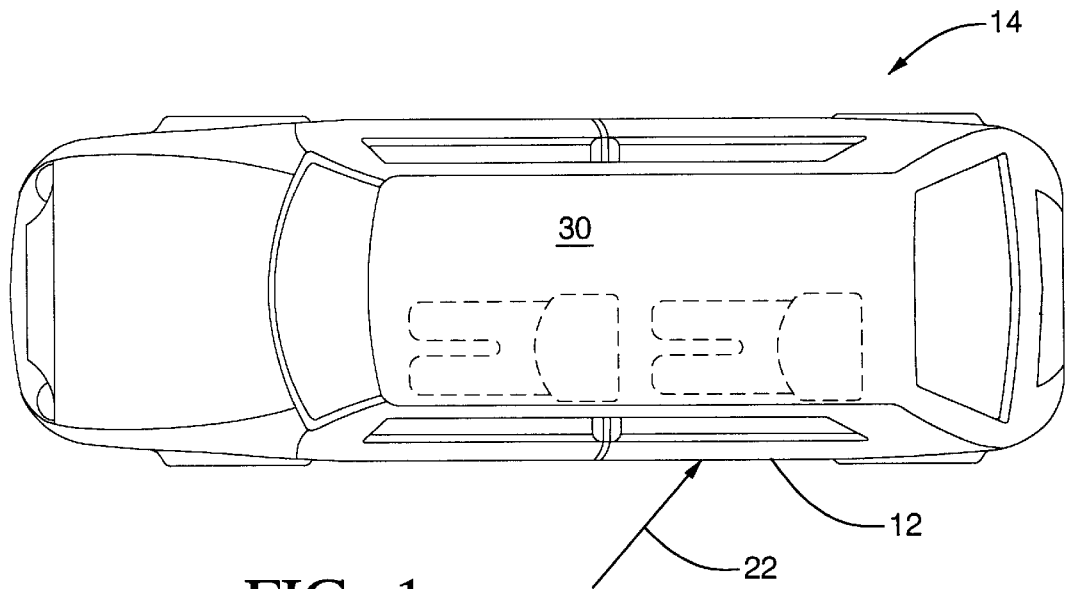
FIG. 1 is a top view of a break away trim panel assembly, according to the present invention, illustrated in operational relationship with a door of a vehicle.
Figure 2:
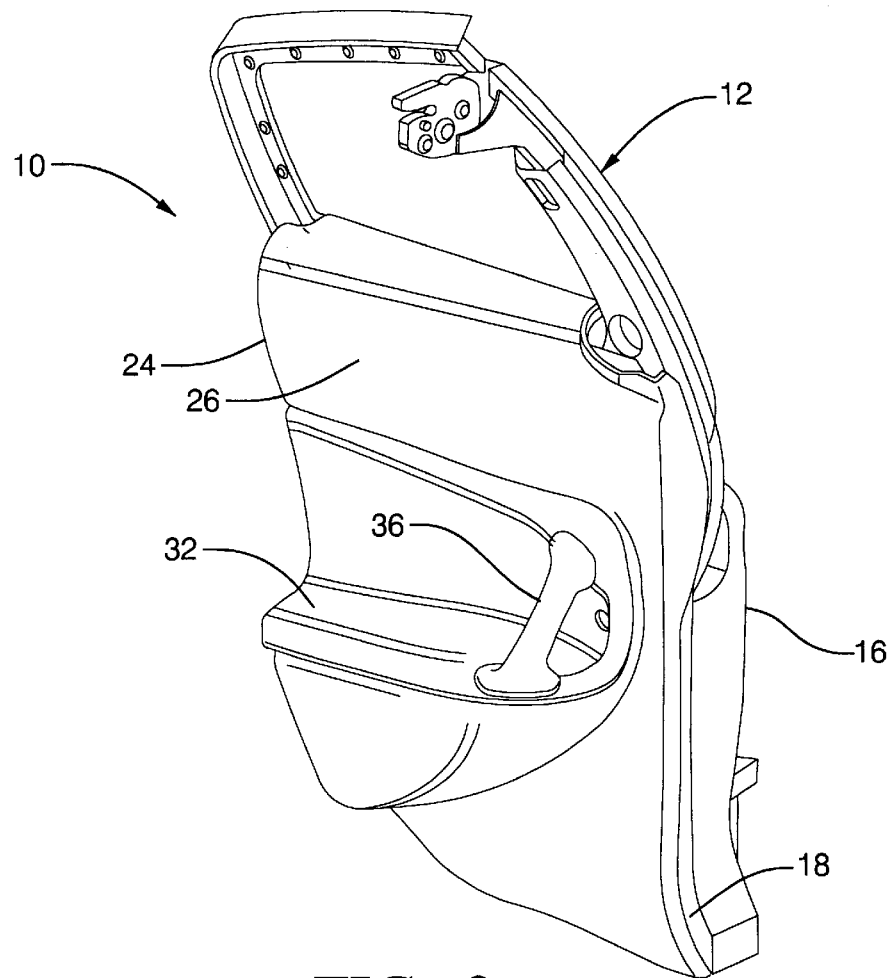
FIG. 2 is a perspective view of the break away trim panel assembly of FIG. 1.
Figure 3:
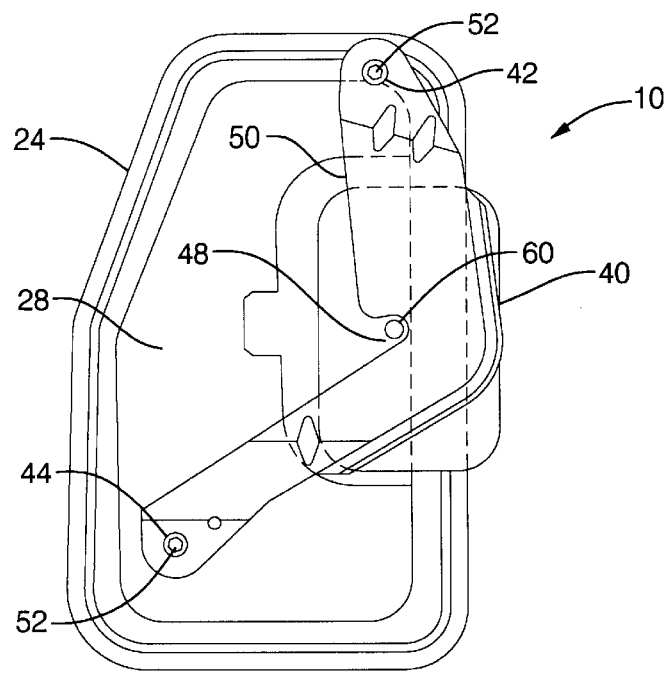
FIG. 3 is an elevational view of an installed door handle reinforcement for the break away trim panel assembly of FIG. 2.

Referring to the drawings and in particular FIGS. 1 and 2, one embodiment of a break away trim panel assembly 10, according to the present invention, is shown for a door 12 of a vehicle 14. The door 12 is conventional and has an outer panel 16 and an inner panel 18 joined together. It should be appreciated that the door 12, in this example, is a rear door. It should also be appreciated that the outer panel 16 may be decorative in appearance, as viewed from outside the vehicle 14.

Referring to FIGS. 2 through 5, the break away trim panel assembly 10 includes a trim panel 24 extending longitudinally and vertically and having a generally rectangular shape. Preferably, the trim panel 24 is ma de of a plastic material such as polypropylene. The trim panel 24 has an inner side 26 and an outer side 28. It should be appreciated that the inner side 26 of the trim panel 24 is viewed from an occupant compartment 30 (FIG. 1) of the vehicle 141, and may be decorative in appearance. The inner si de 26 of the trim panel 24 may include such features as an integrally formed arm rest portion 32. The trim panel 24 may include an upper aperture 34 and lower aperture (not shown) for a function to be described. The outer side 28 of the trim panel 24 is attached to the inner panel 18 of the door 12, in a manner to be described. It should be appreciated that the break away trim panel assembly 10 may be an assembly mounted to other panels (not shown) of the vehicle 14.

The break away trim panel assembly 10 includes a door handle 36 attached to the inner side 26 of the trim panel 24, in a manner to be described, that is used to opens the door 12 or to help retains it in a closed position. The door handle 36 is known and conventional in the art. It should be appreciated that, in this example, the door handle 36 has a general "I" shape. The door handle 36 may include an upper aperture 38 and a lower aperture (not shown) for securing the door handle 36 to the trim panel 24 in a manner to be described.

The break away trim panel assembly 10 also includes a door handle reinforcement 40 that provides structural strength to the trim panel 24 in an attachment area of the door handle 36. The door handle reinforcement 40 is a generally planar member extending vertically and horizontally a sufficient amount to provide reinforcement to the door handle 36 and trim panel 24. In this example, the door handle reinforcement 40 has a general "J" shape. The door handle reinforcement 40 also includes an upper aperture 42 and a lower aperture 44 for securing the door handle 36 to the door handle reinforcement 40 using a fastener 46, in a manner to be described.

The door handle reinforcement 40 further includes a channel portion 48 formed along a side edge 50 and extending into the door handle reinforcement 40 a sufficient amount. It should be appreciated that, in this example, the channel portion 48 is formed along an inner side edge 50 of the "J" shaped door handle reinforcement 40. The channel 48 provides a surface area for receiving a fastener 46 for securing the trim panel 24 to the door 12, in a manner to be described. The channel 48 also provides a pathway for detaching the fastener 46 from the door handle reinforcement 40 as a result of an applied force 22 (FIG. 1) to the door 12 at a predetermined angle. For example, the predetermined angle may be twenty-seven degrees (27°) relative to the direction of travel of the vehicle 14.

Figure 4:
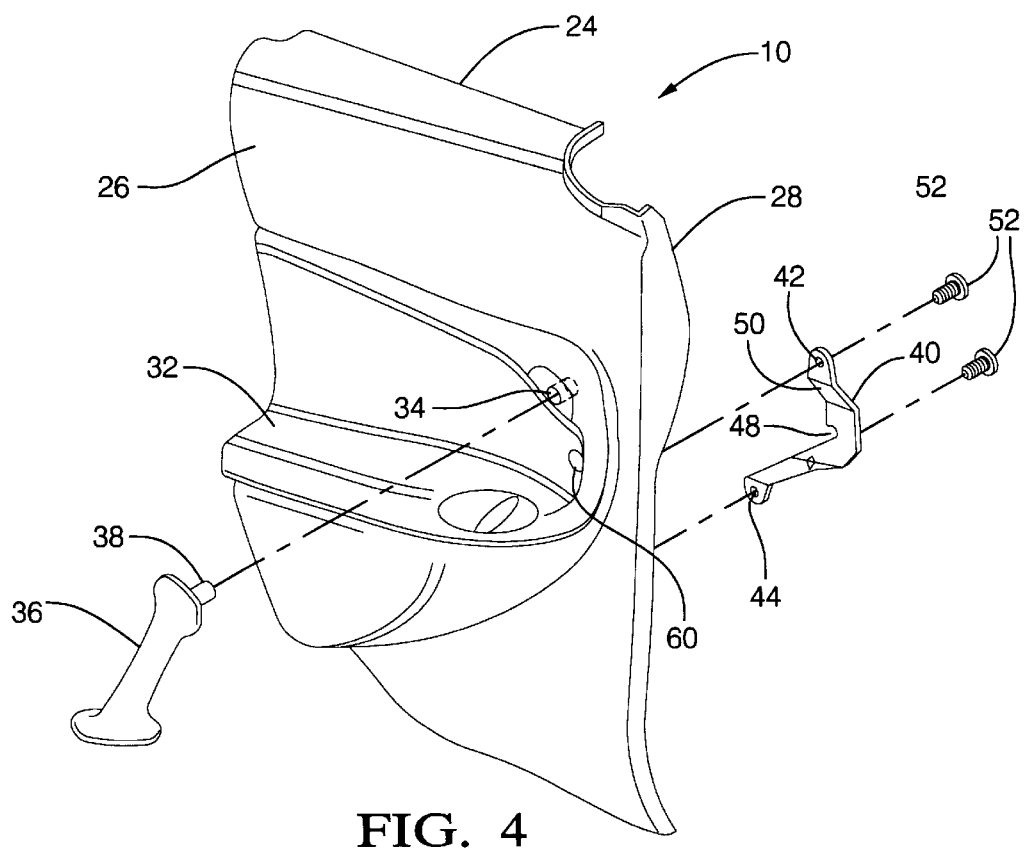
FIG. 4 is an exploded view of the break away trim panel assembly of FIG. 2.

As illustrated in FIG. 4, the break away trim panel assembly 10 is attached to the door 12 by first positioning the door handle 36 in a suitable location on the inner side 26 of the trim panel 24. The door handle reinforcement 40 is positioned on the outer side 28 of the trim panel 24 opposite the door handle 36. The door handle 36, trim panel 24 and door handle reinforcement 40 are secured together using a suitable means such as a fastener 52. For example, the upper aperture 34 and lower aperture in the trim panel 24 are aligned with the corresponding upper aperture and lower apertures in the door handle 36 and the corresponding upper and lower apertures 42, 44 in the door handle reinforcement 40. A fastener 52, such as a threaded bolt, is disposed within the upper apertures 34, 38 and 42 and lower aperture 44 to fixedly secure the door handle 36, trim panel 24, and door handle reinforcement 40 together. Preferably, the bolt 52 is installed so that it is not visible from the occupant compartment 30.

Figure 5:
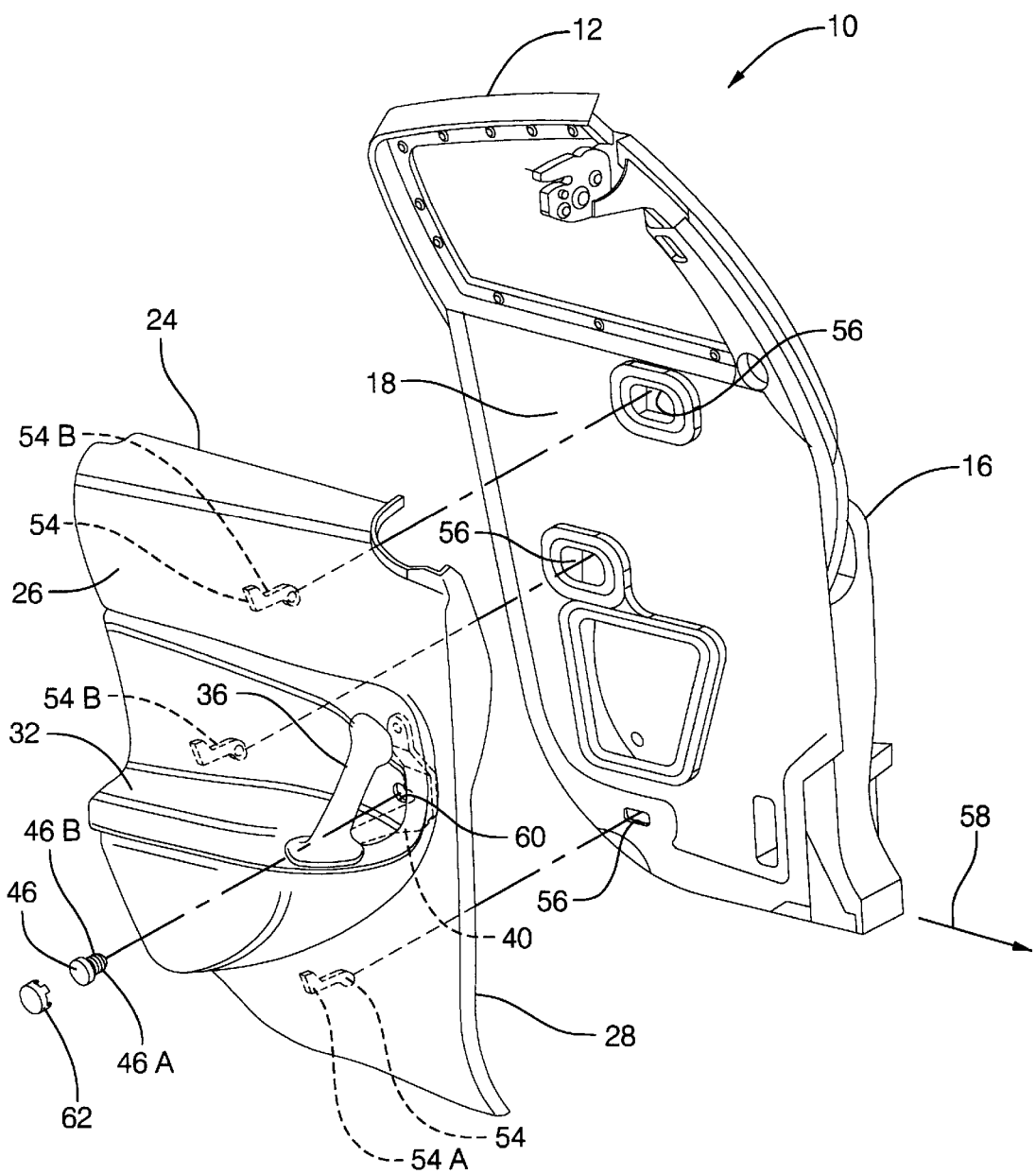
FIG. 5 is an exploded view of the break away trim panel assembly and door of FIG. 2.

As illustrated in FIG. 5, the trim panel 24 of the break away trim panel assembly 10 is attached to the inner panel 18 of the door 12 by a suitable attaching means such as a retainer 54 or fastener 46. It should be appreciated that more than one type of attachment may be used concurrently. For example, a retainer 54 such as a clip or hook may be retained within a slot 56 formed in the inner panel 18 of the door 12 for receiving the retainer 54. Advantageously, the slot 56 is elongated in a forward direction 58, so that the retainer 54 or fastener 46 moves in a predetermined direction within the slot 56 to detach the trim panel 24 from the door 12 in the predetermined direction, if the applied force 22 is directed towards the door 12. In this example, a combination of two metal clips 54a is used to secure a lower portion of the trim panel 24 to the door 12 and two hooks 54b are used to secure an upper portion of the trim panel 24 to the door 12.

The fastener 46, such as a bolt, may also be used to secure the trim panel 24 to the inner panel 18 of the door 12. The fastener 46 extends therethrough an aperture 60 in the trim panel 24, such that a head portion 46a of the fastener 46 is engaged within the channel portion 48 of the door handle reinforcement 40, and the shank 46b of the fastener 46 is retained by the inner panel 18 of the door 12. Advantageously, the head 46a of the 10 fastener 46 engages sufficient surface area of the channel portion 48 of the door handle reinforcement 40 to hold the trim panel 24 to the door 12, while still allowing the trim panel 24 to break away upon the application of the force 22. It should be appreciated that a decorative cap 62 may be disposed over the head 46a of the fastener 46 to provide an aesthetically pleasing appearance to the break away trim panel assembly 10.

Advantageously, the channel 48 in the door handle reinforcement 40 has a suitable shape that allows the fastener 46 to travel through the channel 48 upon the application of the force 22 to the door 12. The movement of the fastener 46 through the channel 48 disengages the trim panel 24 from the inner panel 18 of the door 12 in a predetermined direction 58, which in this example is forwards. Advantageously, the elongated slots 56 in the inner panel 18 of the door 12 bias the direction of travel of the trim panel 24 in a forward direction 58. It should be appreciated that the movement of the trim panel 24 in the forward direction 58 causes the trim panel 24 to flex inward, thus transferring the energy from the applied force 22 back into the trim panel 24.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A break away trim panel assembly for a panel in an occupant compartment of a vehicle comprising:

a trim panel having an inner side and an outer side;

a reinforcement attached to said outer side of said trim panel wherein said reinforcement includes a channel; and a fastener disposed within said channel for attaching said trim panel to the panel wherein application of a force from a predetermined angle pushes said fastener through said channel to break away said trim panel from the panel in a predetermined direction.

2. A break away trim panel assembly as set forth in claim 1 including a retainer on said trim panel adapted to be disposed within an elongated slot in the panel.

3. A break away trim panel assembly for a door in an occupant compartment of a vehicle comprising:

a trim panel having an inner side and an outer side;

a door handle attached to said inner side of said trim panel;

a door handle reinforcement attached to said outer side of said trim panel opposite said door handle, wherein said door handle reinforcement includes a channel; and a fastener disposed within said channel for attaching said trim panel to the door, wherein application of a force from a predetermined angle breaks away said trim panel from the door in a predetermined direction.

4. A break away trim panel assembly as set forth in claim 3 wherein said fastener includes a head portion to engage said channel in said door handle reinforcement to secure said trim panel to the door.

5. A break away trim panel assembly as set forth in claim 3 wherein said trim panel includes a retainer and the door includes an elongated slot for retaining said retainer to attach said trim panel to the door.

6. A break away trim panel assembly as set forth in claim 5 wherein said retainer is a clip.

7. A break away trim panel assembly as set forth in claim 5 wherein said retainer is a hook.

8. A break away trim panel assembly for a door in an occupant compartment of a vehicle comprising:

- a trim panel having an inner side and an outer side;
- a door handle attached to said inner side of said trim panel;
- a door handle reinforcement attached to said outer side of said trim panel opposite said door handle, wherein said door handle reinforcement includes a channel;
- a retainer integral with said trim panel corresponding to an elongated slot in the door, wherein said trim panel is attached to the door by positioning said retainer in the elongated slot; and
- a fastener disposed within said channel for attaching said trim panel to the door, wherein application of a force from a predetermined angle pushes said fastener through said channel to break away said trim panel from the door in a predetermined direction.

9. A break away trim panel assembly as set forth in claim 8 wherein said fastener includes a a head portion to engage said channel in said door handle reinforcement to secure said trim panel to the door.

10. A break away trim panel assembly as set forth in claim 8 wherein said retainer is a clip.

11. A break away trim panel assembly as set forth in claim 8 wherein said retainer is a hook.

* * * * *